United States Patent
Lee

(10) Patent No.: US 11,104,356 B2
(45) Date of Patent: Aug. 31, 2021

(54) DISPLAY DEVICE AND METHOD FOR A VEHICLE

(71) Applicants: HYUNDAI MOTOR COMPANY, Seoul (KR); KIA MOTORS CORPORATION, Seoul (KR)

(72) Inventor: Sung Woo Lee, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/071,644

(22) Filed: Oct. 15, 2020

(65) Prior Publication Data

US 2021/0129860 A1    May 6, 2021

(30) Foreign Application Priority Data

Nov. 4, 2019 (KR) .......... 10-2019-0139697

(51) Int. Cl.
  *B60W 50/14* (2020.01)
  *B60K 35/00* (2006.01)
  *G06K 9/00* (2006.01)

(52) U.S. Cl.
  CPC ........... *B60W 50/14* (2013.01); *B60K 35/00* (2013.01); *G06K 9/00805* (2013.01); *B60K 2370/1529* (2019.05); *B60K 2370/177* (2019.05); *B60K 2370/178* (2019.05); *B60K 2370/179* (2019.05); *B60K 2370/195* (2019.05); *B60W 2050/146* (2013.01)

(58) Field of Classification Search
None
See application file for complete search history.

(56) References Cited

U.S. PATENT DOCUMENTS

| | | | | |
|---|---|---|---|---|
| 6,133,825 A | * | 10/2000 | Matsuoka | B60Q 9/008 340/436 |
| 10,319,039 B1 | * | 6/2019 | Konrardy | G06Q 40/08 |
| 10,723,264 B2 | | 7/2020 | Fujisawa | |
| 10,809,738 B2 | * | 10/2020 | Heo | B60W 30/18154 |
| 2002/0135467 A1 | * | 9/2002 | Koike | G01S 5/04 340/436 |
| 2006/0089801 A1 | * | 4/2006 | Sawamoto | B60W 40/02 701/301 |
| 2010/0201509 A1 | * | 8/2010 | Hara | G08G 1/166 340/435 |
| 2013/0141250 A1 | * | 6/2013 | Mathieu | B60K 35/00 340/901 |
| 2014/0340510 A1 | * | 11/2014 | Ihlenburg | G02B 3/14 348/118 |

(Continued)

FOREIGN PATENT DOCUMENTS

| | | |
|---|---|---|
| JP | 5459002 B2 | 4/2014 |
| JP | 6136238 B2 | 5/2017 |
| JP | 6319350 B2 | 5/2018 |

*Primary Examiner* — Chico A Foxx
(74) *Attorney, Agent, or Firm* — Lempia Summerfield Katz LLC

(57) ABSTRACT

A display device of a vehicle includes: a sensor device for detecting an object located around the vehicle; a control module that reads and tracks the detected object based on the detection result of the sensor device; and an information display for providing the reading and tracking result of the object of the control module as continuous visual information to a passenger of the vehicle.

14 Claims, 7 Drawing Sheets

(56) References Cited

U.S. PATENT DOCUMENTS

| | | | | |
|---|---|---|---|---|
| 2015/0042799 A1* | 2/2015 | Zhang | ...................... | H04N 7/18 |
| | | | | 348/148 |
| 2016/0110618 A1* | 4/2016 | Oba | ................... | G06K 9/6215 |
| | | | | 348/148 |
| 2016/0129907 A1* | 5/2016 | Kim | ...................... | B60W 30/09 |
| | | | | 701/26 |
| 2017/0153644 A1* | 6/2017 | Otsuka | .................. | B60W 50/14 |
| 2017/0274898 A1* | 9/2017 | Nakamura | ...... | B60W 30/18163 |
| 2017/0334459 A1* | 11/2017 | McNew | ................ | B60W 50/14 |
| 2018/0086346 A1 | 3/2018 | Fujisawa | | |
| 2018/0105040 A1* | 4/2018 | Ryu | ....................... | G08G 1/165 |
| 2018/0118109 A1 | 5/2018 | Fujisawa | | |
| 2018/0201260 A1* | 7/2018 | Ichikawa | ............... | G01S 17/46 |
| 2018/0253610 A1* | 9/2018 | Hall | .......................... | G06T 7/70 |
| 2018/0370433 A1* | 12/2018 | Huang | ............... | G06K 9/00805 |
| 2019/0011712 A1* | 1/2019 | Nagano | .................... | G09G 5/38 |
| 2019/0061745 A1* | 2/2019 | Hatano | ................. | B60W 20/15 |
| 2019/0196464 A1* | 6/2019 | Lockwood | ........... | G05D 1/0016 |
| 2019/0225153 A1* | 7/2019 | Nemeth | .................... | B60R 1/00 |
| 2019/0227675 A1* | 7/2019 | Cramer | .............. | G06F 3/04897 |
| 2019/0259284 A1* | 8/2019 | Khadloya | ................. | G06T 7/97 |
| 2019/0262992 A1* | 8/2019 | Kim | ..................... | G05D 1/0246 |
| 2019/0291642 A1* | 9/2019 | Chae | ......................... | B60R 1/00 |
| 2019/0381937 A1* | 12/2019 | Rakshit | ................. | B60K 35/00 |
| 2019/0383946 A1* | 12/2019 | Namba | ............. | G06K 9/00805 |
| 2020/0014898 A1* | 1/2020 | Imai | ........................ | G06T 7/215 |
| 2020/0148203 A1* | 5/2020 | Taniguchi | .............. | B60K 35/00 |
| 2020/0209393 A1* | 7/2020 | Aoki | ....................... | G01S 7/4815 |
| 2020/0215917 A1* | 7/2020 | Schoning | ............. | B60W 50/14 |
| 2020/0307617 A1* | 10/2020 | Sakai | ................ | G01C 21/3697 |
| 2020/0371217 A1* | 11/2020 | Namba | ................ | G06K 9/2036 |

\* cited by examiner

DISPLAY DEVICE AND METHOD FOR A VEHICLE

CROSS-REFERENCE TO RELATED APPLICATION

This application claims the benefit of priority to Korean Patent Application No. 10-2019-0139697, filed in the Korean Intellectual Property Office on Nov. 4, 2019, the entire contents of which are incorporated herein by reference.

TECHNICAL FIELD

The present disclosure relates to a display device and method for a vehicle.

BACKGROUND

A vehicle is used by a driver in the vehicle to move in a desired direction. An automobile is a representative example. Currently, various sensors and electronic devices are equipped for convenience of a user using the vehicle. In particular, studies on an advanced driver assistance system (ADAS) have been actively conducted for convenience of the driver, and further development of an autonomous vehicle has been actively conducted.

SUMMARY

The present disclosure has been made to solve the above-mentioned problems occurring in the prior art while advantages achieved by the prior art are maintained intact.

An aspect of the present disclosure provides a display device and a method for a vehicle that continuously provide, to a passenger of the vehicle, information of the vehicle and information about objects to which priority levels are applied within a traveling radius based on a traveling direction of the vehicle and a traveling situation.

The technical problems to be solved by the present inventive concept are not limited to the aforementioned problems, and any other technical problems not mentioned herein should be clearly understood from the following description by those having ordinary skill in the art to which the present disclosure pertains.

According to an aspect of the present disclosure, a display device of a vehicle includes: a sensor device for detecting an object located around the vehicle; a control module that reads and tracks the detected object based on the detection result of the sensor device; and an information display for providing the reading and tracking result of the object of the control module as continuous visual information to a passenger of the vehicle.

According to another aspect of the present disclosure, a method for displaying object tracking of a vehicle includes: detecting an object in a sensing region around the vehicle; tracking the detected object; selecting an avoidance priority level of the object based on a reading and tracking result of the detected object; determining a traveling path of the vehicle based on the avoidance priority level of the object; and displaying the object tracking for displaying the detected object, the selected avoidance priority level, and the determined traveling path.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
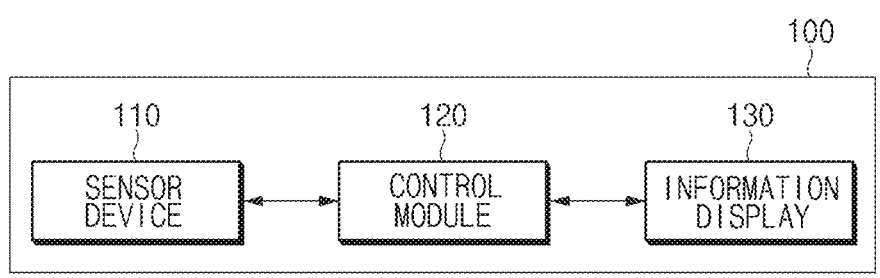
FIG. 1 is a diagram illustrating a configuration of a display device of a vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by those having ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

FIG. 1 is a diagram illustrating a configuration of a display device of a vehicle according to an embodiment of the present disclosure.

A display device 100 of a vehicle according to an embodiment of the present disclosure may be implemented inside the vehicle. In this connection, the display device 100 may be integrally formed with internal control units of the vehicle, or may be implemented as a separate device and connected to the control units of the vehicle by separate connection means. In this connection, the display device 100 may operate in association with an engine and a motor of the vehicle, and may operate in association with the control unit that controls an operation of the engine or the motor.

Referring to FIG. 1, the display device 100 of the vehicle according to an embodiment of the present disclosure may include a sensor device 110, a control module 120, and an information display 130. In this connection, the control module 120 of the display device 100 of the vehicle according to an embodiment of the present disclosure may be implemented as at least one processor.

The sensor device 110 may include a device and a sensor for detecting objects located outside the vehicle to obtain safety information of traveling. In this connection, the objects may be various objects related to the traveling of the vehicle. For example, the objects may include a lane, another vehicle, a pedestrian, a two-wheeled vehicle, a traffic signal, light, a road, a structure, a speed bump, a terrain, an animal, and the like.

The lane may be a traveling lane, a lane next to the traveling lane, and a lane on which an opposite vehicle travels. The lane may be a concept including left and right lines forming the lane.

Another vehicle may be a vehicle traveling around the vehicle. Another vehicle may be a vehicle located within a predetermined distance from the vehicle. For example, another vehicle may be a vehicle preceding or following the vehicle.

The pedestrian may be a person located around the vehicle. The pedestrian may be a person located within a predetermined distance from the vehicle. For example, the pedestrian may be a person located on a sidewalk or a roadway.

The two-wheeled vehicle may be a vehicle located around the vehicle, and moving using two wheels. The two-wheeled vehicle may be a vehicle having the two wheels located within a predetermined distance from the vehicle. For example, the two-wheeled vehicle may include a motorcycle or a bicycle located on the sidewalk or the roadway.

The traffic signal may include a traffic light, a traffic sign, a pattern or text drawn on a road face.

The light may be light generated from a lamp disposed in another vehicle. The light may be light generated from a street lamp. The light may be sunlight.

The road may include the road face, a curve, slopes such as ascent, descent, and the like.

The structure may be an object located around the road and fixed to a ground. For example, the structure may include the street lamp, a street tree, a building, a telephone pole, the traffic light, a bridge, and the like.

The terrain may include a mountain, a hill, and the like.

In one example, the object may be classified into a moving object and a fixed object. For example, the moving object may be a concept including another vehicle, the two-wheeled vehicle, the pedestrian, and the like. The fixed object may be a concept including the traffic signal, the road, the structure, and the like.

The sensor device 110 may include a camera, a radar, a lidar, an ultrasonic sensor, an infrared sensor, and the like.

The camera, which is to acquire an external image of the vehicle to recognize an object, light, and a person around the vehicle, may be implemented as a plurality of cameras connected with each other in parallel. For example, the camera may include a mono camera, a stereo camera, an around view monitoring (AVM) camera, and a 360-degree camera. In one example, the camera may be disposed at an appropriate place of the vehicle for acquiring the external image of the vehicle. For example, the camera may be disposed around at least one of a front windshield, a front bumper, and a radiator grille of the vehicle to acquire an image of a region in front of the vehicle. The camera may be disposed around at least one of a rear glass, a rear bumper, a trunk, and a tail gate to acquire an image of a region behind the vehicle. The camera may be disposed around at least one of a side window, a side mirror, a fender, and a door of the vehicle to acquire an image of a side region of the vehicle. The camera may provide the acquired images to the control module 120.

The radar may detect the object by the medium of an electromagnetic wave in a time of flight (TOF) scheme or a phase-shift scheme, and may detect a position of the detected object, a distance to the detected object, and a relative velocity. The radar may be disposed at an appropriate location outside the vehicle to detect the object located around the vehicle.

The lidar may detect the object by the medium of laser light in a time of flight (TOF) scheme or a phase-shift scheme, and may detect a position of the detected object, a distance to the detected object, and a relative velocity. The lidar may be disposed at an appropriate location outside the vehicle to detect the object located around the vehicle.

The ultrasonic sensor, which is a sensor that generates a ultrasonic wave to detect a distance, a thickness, a motion, and the like, may detect the object, and detect a position, a distance, and a relative velocity of the detected object.

The infrared sensor may transmit and receive infrared light to detect the object, and detect a position, a distance, and a relative velocity of the detected object.

The sensor device 110 may include the camera, the radar, the lidar, the ultrasonic sensor, the infrared sensor, and the like for detecting the object outside the vehicle, and a detection result of each component of the sensor device 110 may be provided to the control module 120.

The control module 120 may control operations of the camera, the radar, the lidar, the ultrasonic sensor, the infrared sensor, and the like constituting the sensor device 110. In addition, the control module 120 may receive sensing information from the camera, the radar, the lidar, the ultrasonic sensor, and the infrared sensor to sense and read the objects outside the vehicle, detect a risk factor based on a traveling direction of the vehicle, and visually display the sensed risk factor to a passenger of the vehicle through the information display 130. In this connection, the controller 120 may display the risk factor based on the traveling direction by selecting and displaying avoidance priority levels of the detected and read objects. For example, the control module 120 may match the avoidance priority levels selected based on information of the read objects outside the vehicle to the objects, and may provide the objects matched with the avoidance priority levels to the passenger through the information display 130 as visual information.

In addition, the control module 120 may detect and read the object around the traveling vehicle to set a safe path based on the traveling direction of the vehicle, and may visually display the set safe path through the information display 130. For example, the control module 120 may read the object detected around the traveling vehicle to set a traveling direction of the vehicle based on avoidance direction setting when the read object is an object to be avoided, and may visually display the traveling direction set through the information display 130 as the safe path. In this connection, the object to be avoided may include a counter vehicle against traveling safety, such as an overspeed vehicle, a vehicle with a drowsy driver, and the like based on information about a position, a relative velocity, a proximity distance, and a behavior yaw rate of the counter vehicle.

The control module 120 may continuously track the detected object and provide the continuously tracked object as continuous visual information through the information display 130.

A description of the selecting, by the control module 120, of the avoidance priority level for the detected object as an example is disclosed as follows.

The control module 120 of the display device according to an embodiment of the present disclosure may select the pedestrian reflected in a traveling trajectory of the vehicle as the highest avoidance priority level. In addition, the control module 120 may highlight an object selected as the highest avoidance priority level differently from other objects and allow the highlighted object to be displayed on the information display 130. For example, the control module 120 may display the object selected as the highest avoidance priority level in a highlighted color (e.g., red), and allow a caution sign such as a letter, an image, a symbol, and the like to be displayed on the information display 130 at a position adjacent to the object selected as the highest avoidance priority level.

The control module 120 of the display device according to an embodiment of the present disclosure may select a two-wheeled vehicle on which the user boarded reflected in the traveling trajectory of the vehicle as a second avoidance priority level, and display the two-wheeled vehicle on the information display 130. For example, the control module 120 may display an object selected as the second avoidance priority level in blue on the information display 130.

The control module 120 of the display device according to an embodiment of the present disclosure may select a counter vehicle reflected in the traveling trajectory of the vehicle as a third avoidance priority level, and display the counter vehicle on the information display 130. For example, the control module 120 may display an object selected as the third avoidance priority level in yellow on the information display 130.

In addition, the control module 120 may separately manage lorries, and counter vehicles suspected of overspeed or drowsy driving among the counter vehicles reflected in the traveling trajectory of the vehicle as a dangerous level. For example, the control module 120 may select an object whose risk is sensed, i.e., the lorries as the second avoidance priority level, and may select an object that may cause an accident, i.e., the counter vehicles suspected of the overspeed or the drowsy driving, as a first avoidance priority level, i.e., the highest avoidance priority level.

The control module 120 of the display device according to an embodiment of the present disclosure may or may not display the detected object on the information display 130 based on switch manipulation of the passenger. In one example, when the object is not displayed on the information display 130 by the switch manipulation of the passenger, and when the avoidance priority level of the detected object is equal to or higher than a preset avoidance priority level, the control module 120 may display the detected object on the information display 130. In addition, the control module 120 may display the detected object on the information display 130 when the vehicle travels in a dangerous region such as an accident-frequent region. In this connection, the control module 120 may determine that the vehicle is traveling in the dangerous region in conjunction with a navigation or a GPS.

The information display 130 may include information display devices of types of a transparent display, a projector, and a head up display (HUD) displayed on a vehicle glass. The vehicle glass may include a wind shield glass, a sunroof, a door window, a rear glass, an inside mirror, an outside mirror, and the like.

Figure 2:
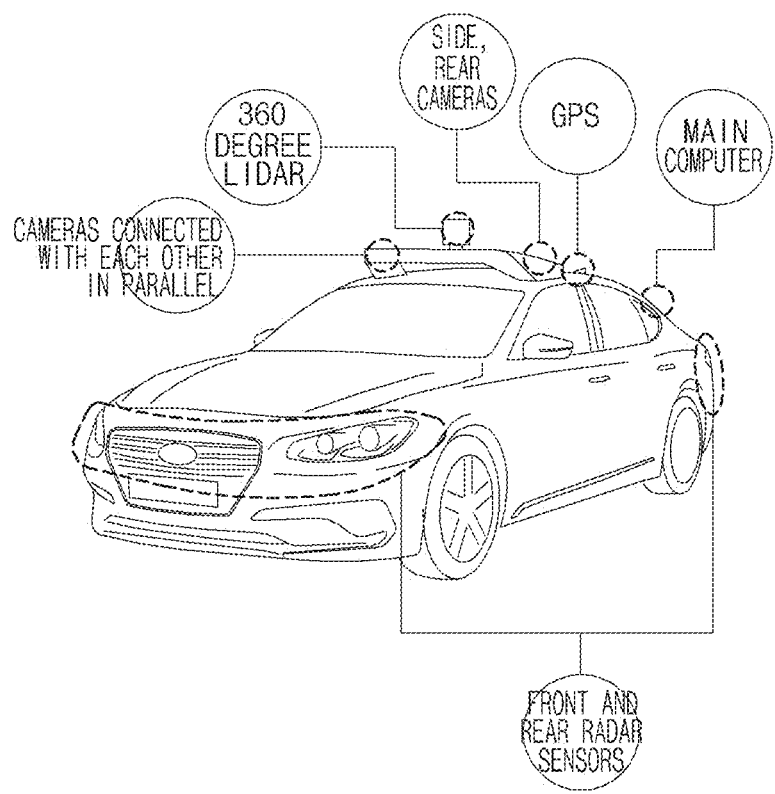
FIG. 2 is a diagram illustrating an outer shape of a vehicle to which a sensor device shown in FIG. 1 is applied.

FIG. 2 is a diagram illustrating an outer shape of a vehicle to which a sensor device shown in FIG. 1 is applied. FIG. 2 discloses the outer shape of the vehicle on which the sensor device 110 capable of sensing the vicinity of the vehicle, such as the camera, the lidar, the radar, and the like is disposed. FIG. 2 is only an embodiment and does not limit a position of each component of the sensor device 110.

The camera may include a front camera capable of capturing the region in front of the vehicle, a rear camera capable of capturing the region behind the vehicle, and a side camera capable of capturing a side of the vehicle. In this connection, at least one of the front camera, the rear camera, and the side camera may include a plurality of cameras connected with each other in parallel. In one embodiment, the front camera for capturing the region in front of the vehicle may include a plurality of cameras connected with each other in parallel. The camera may recognize the object, the light, and the person around the vehicle.

The lidar may be used as a component that recognizes the vicinity of the vehicle in a 360-degree angle range using the laser light. The lidar sensing the vicinity of the vehicle in the 360-degree angle range may be referred to as a 360-degree lidar. Further, although FIG. 2 illustrates the 360-degree lidar, which may recognize the vicinity of the vehicle in the 360-degree angle range, each lidar that may recognize each of the regions in front of and behind the vehicle, and left and right sides of the vehicle may be disposed on the vehicle. In FIG. 2, the lidar and the camera may be arranged at positions of the vehicle that may recognize the vicinity of the vehicle very well, for example, a highest point of the vehicle (a vehicle roof).

The radar may recognize an obstacle adjacent to the vehicle using the electromagnetic wave. Each radar may be disposed at each of front and rear portion of the vehicle to recognize a vehicle ahead of the vehicle, a vehicle behind the vehicle, and the adjacent obstacle. For example, each radar may be disposed on each of a front bumper and a rear bumper of the vehicle.

In addition, the vehicle may include a global positioning system (GPS) and a main computer. A GPS receiver among components constituting the GPS may be disposed on the roof of the vehicle. The main computer may be disposed in the trunk of the vehicle, and the control module according to the present disclosure embodiment may be included in the main computer. Recently, a development of the vehicle including the main computer that may determine a current state based on the detection results of the sensors to control the vehicle is increasing for safety and convenience of the vehicle passenger, such as an advanced driver assistance system (ADAS) for autonomous driving.

Figure 3:
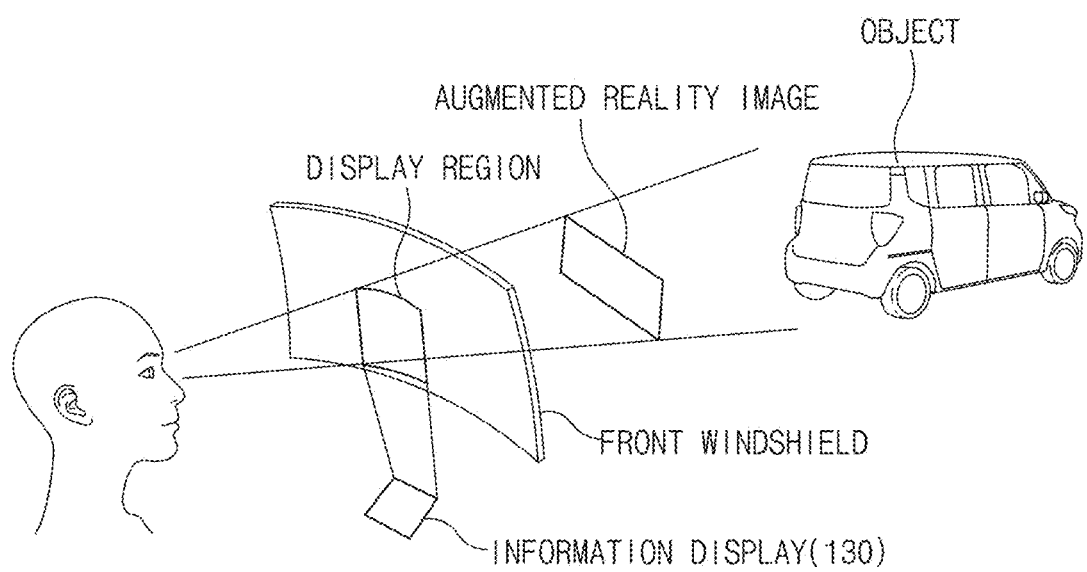
FIG. 3 is a diagram for illustrating an operation of an information display illustrated in FIG. 1.

FIG. 3 is a diagram illustrating an embodiment of an information display included in a display device of a vehicle according to an embodiment of the present disclosure. FIG. 3 is a conceptual diagram illustrating an operation of realizing an augmented reality image through the front windshield by the information display 130. Further, it is assumed that the information display 130 is the head up display (HUD).

The control module 120 may be connected with the sensor device 110 to generate image data for forming the augmented reality image based on the sensing results of the camera, the radar, the lidar, the ultrasonic sensor, the infrared sensor, and the like, and provide the generated image data to the information display 130.

The information display 130 may project display light for realizing the augmented reality image toward the front windshield by control of the control module 120.

For example, the control module 120 may detect an object existing in front of the vehicle based on the front image provided from the camera of the sensor device 110, and provide an image data for forming an augmented reality image corresponding to the detected object to the information display 130.

In this connection, the augmented reality image may be realized by the display light projected on the front windshield. Further, the augmented reality image may appear to the driver to be displayed outside an object (e.g., the vehicle) beyond a display region rather than in the display region of the front windshield. For example, the augmented reality image may be a graphic object that provides information about a contour line and a speed of an object, a collision alert, and the like.

In FIG. 3, the function of the information display 130 has been described by taking the information display 130 as the HUD as an example. However, when the information display 130 is the projector, the projector may provide the augmented reality image to the driver by projecting the display light onto the front windshield, similar to the HUD. In addition, when the information display 130 is the transparent display, unlike the HUD and the projector that project the display light onto the front windshield, the front windshield may display the augmented reality image directly.

Figure 4:
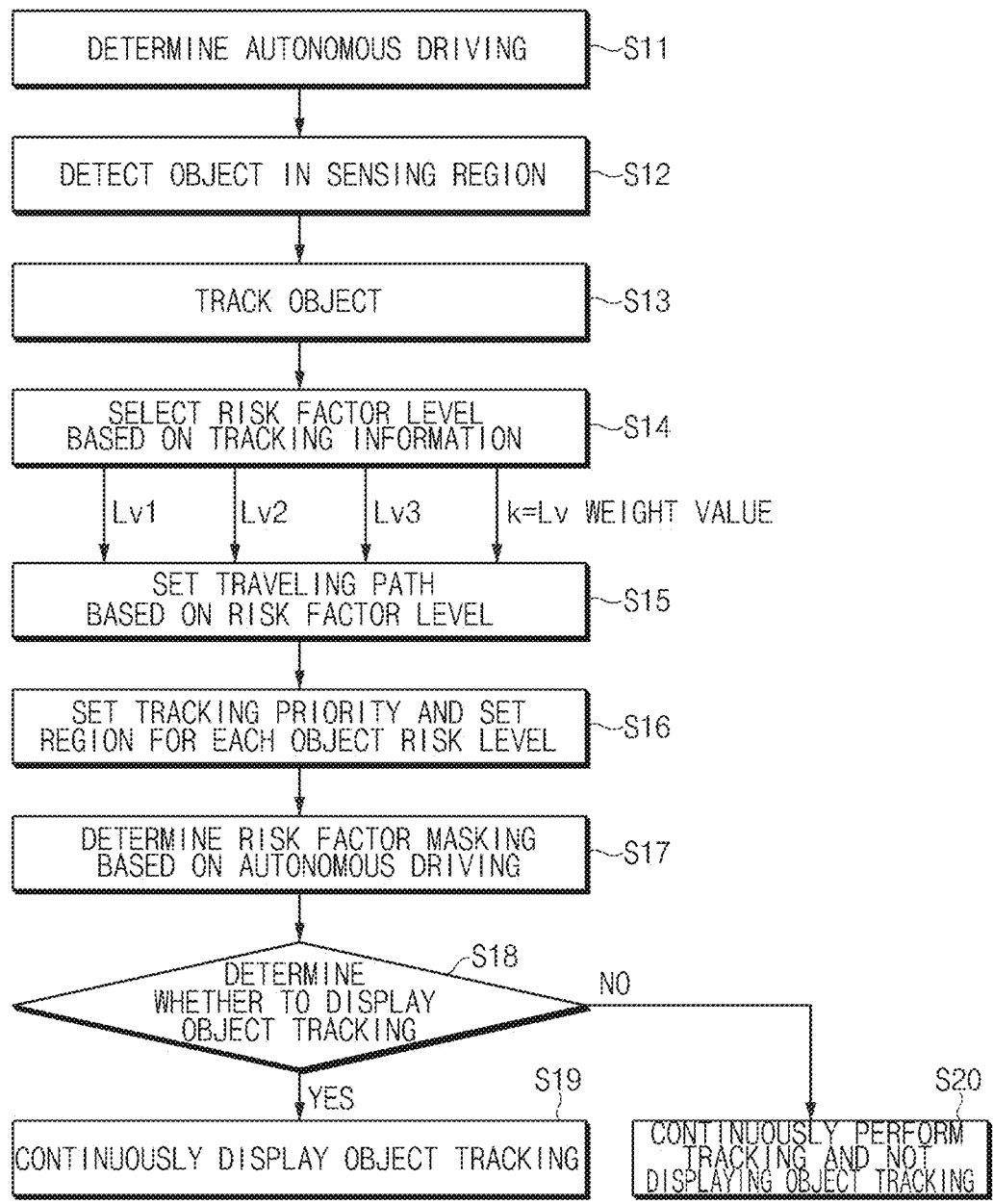
FIG. 4 is a diagram illustrating an operation flow of a display device of a vehicle according to an embodiment of the present disclosure.

FIG. 4 is a diagram illustrating an operation flow of a display device of a vehicle according to an embodiment of the present disclosure. FIG. 4 illustrates operations of the display device of the vehicle capable of the autonomous driving, which may be identical to operations of the display device of the vehicle equipped with the advanced driver assistance system (ADAS). In this connection, determining the autonomous driving (S11) may be equal to starting an operation of the advanced driver assistance system.

The determining of the autonomous driving (S11) may include determining whether the vehicle is performing an autonomous driving operation. The control module 120 may determine whether the vehicle is being autonomously traveled.

Detecting an object in a sensing region (S12) may include detecting the object around the vehicle by operating the sensor device 110. The sensor device 110 according to an embodiment of the present disclosure may include the camera, the radar, the lidar, the ultrasonic sensor, the infrared sensor, and the like. Further, the sensing results obtained through the camera, the radar, the lidar, the ultrasonic sensor, the infrared sensor, and the like may be transmitted to the control module 120. The control module 120 may detect the object around the vehicle based on the sensing results.

Tracking the object (S13) may include tracking the object until the object detected in the detecting of the object in the sensing region (S12) is located outside the sensing region. The control module 120 may track the detected object until the detected object is farther from the vehicle than a preset distance based on the sensing results of the camera, the radar, the lidar, the ultrasonic sensor, the infrared sensor, and the like.

Selecting a risk factor level based on tracking information (S14) may include reading the object detected around the vehicle to select the avoidance priority level for the object when the read object is the object to be avoided. For example, in the selecting of the risk factor level based on the tracking information (S14), the object read as the pedestrian may be selected as the first avoidance priority level (Lv1), the two-wheeled vehicle on which the user is boarded may be selected as the second avoidance priority level (Lv2), and another vehicle around the vehicle may be selected as the third avoidance priority level (Lv3). In this connection, an object whose risk is sensed among the objects of the third avoidance priority level may be selected as the second avoidance priority level by applying a weight value (K=Lv weight value), and an object that may cause an accident may be selected as the first avoidance priority level by applying the weight value (K=Lv).

Setting the traveling path based on the risk factor level (S15) may include setting the traveling direction of the vehicle based on the setting of the avoidance direction based on the avoidance priority levels of the objects selected in the selecting of the risk factor level based on the tracking information (S14).

Setting a tracking priority and setting a region for each object risk level (S16) may include setting a tracking priority based on the avoidance priority level assigned to each object. Further, the setting of the tracking priority and the setting of the region for each object risk level may include setting the dangerous region, and automatically displaying a detected object on the information display 130 when the vehicle travels the dangerous region. In this connection, the control module 120 may be connected to the navigation or the GPS to determine whether the vehicle is traveling in the dangerous region.

Determining risk factor masking based on the autonomous driving (S17) may include matching different indications to the objects based on the avoidance priority levels of the detected objects. For example, the object of the first avoidance priority level may be displayed in red, the object of the second avoidance priority level may be displayed in blue, and the object selected of the third avoidance priority level may be displayed in yellow.

Determining whether to display the object tracking (S18) may include providing the tracking results of the detected objects based on the switch manipulation of the passenger as the continuous visual information through the information display 130 to the passenger, and performing the detection and the tracking of the object continuously but not providing the tracking results as the visual information to the passenger. For example, in the determining of the whether to display the object tracking (S18), when it is determined that the switch manipulation result of the passenger is to receive the tracking result of the detected object as the visual information (yes), continuously displaying the object tracking (S19) may be performed. On the other hand, in the determining of the whether to display the object tracking (S18), when it is determined that the switch manipulation result of the passenger is not to receive the tracking result of the detected object as the visual information (no), continuously performing the tracking and not displaying the object tracking (S20) may be performed. In this connection, in the determining of the whether to display the object tracking (S18), even though it is determined that the switch manipulation result of the passenger is not to receive the tracking result of the object as the visual information, and when the vehicle enters or travels to the dangerous region set in the setting of the tracking priority and setting of the region for each object risk level (S16), the continuously displaying of the object tracking (S19) may be performed automatically.

The continuously displaying of the object tracking (S19) may include providing the tracking result of the detected object to the passenger as the continuous visual information through the information display 130.

The continuously performing of the tracking and not displaying of the object tracking (S20) may include continuously performing the object detection and tracking but not displaying the tracking result as the visual information to the passenger.

Figure 5:
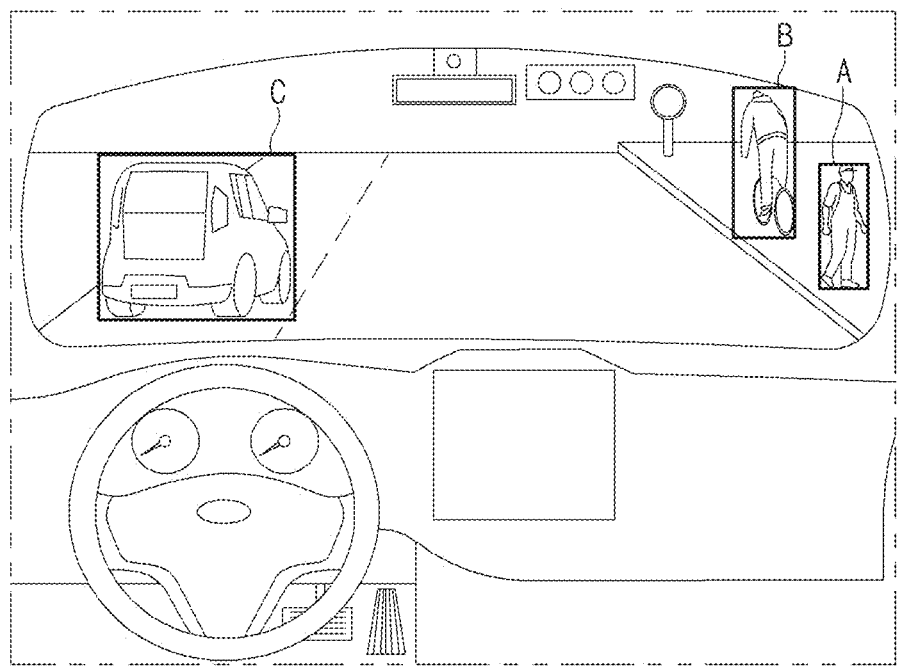
FIGS. 5, 6A, and 6B are diagrams for illustrating operations of a display device of a vehicle according to an embodiment of the present disclosure.

FIGS. 5 and 6 are diagrams for illustrating operations of a display device of a vehicle according to an embodiment of the present disclosure. FIGS. 5 and 6 illustrate that the display device of the vehicle according to an embodiment of the present disclosure is applied to the front windshield of the vehicle. The front windshield may be the transparent display. In addition, the display light of the HUD or the projector may be projected onto the front windshield.

FIG. 5 illustrates display of an object based on an avoidance priority level of a display device of a vehicle according to an embodiment of the present disclosure. In this connection, each detected object may be displayed in a rectangular shape surrounding each object in the display device of the vehicle according to an embodiment of the present disclosure.

When it is determined that the detected object is a pedestrian A, the detected object may be selected as the highest avoidance priority level, i.e., the first avoidance priority level. A rectangle surrounding the pedestrian A may be displayed in red.

When it is determined that the detected object is a two-wheeled vehicle B, which a user is riding, the detected object may be selected as the avoidance second priority level. A rectangle surrounding the user and the two-wheeled vehicle may be displayed in blue.

When it is determined that the detected object is another vehicle C, the detected object may be selected as the avoidance third priority level. A rectangle surrounding another vehicle may be displayed in yellow.

Figure 6A:
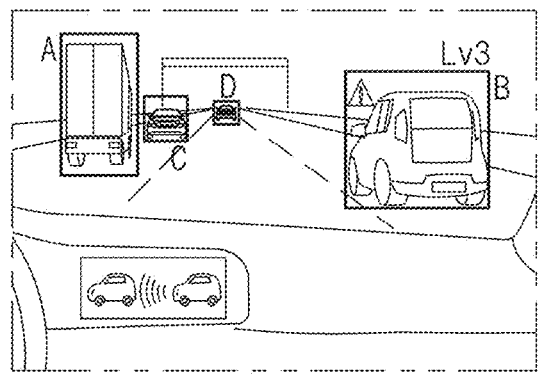
Figure 6B:
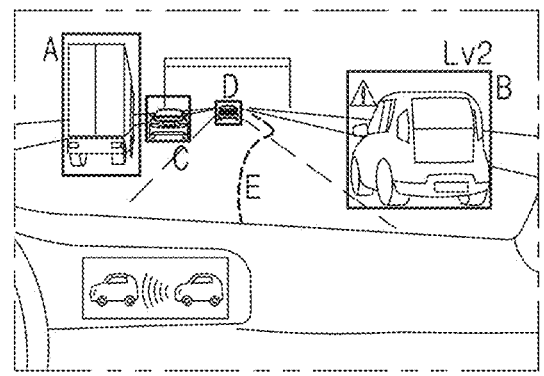

FIGS. 6A and 6B illustrates a case in which an avoidance priority level of one of the detected objects is changed by applying a weight value.

FIG. 6A, which is a view illustrating objects detected by the traveling vehicle, displays first to fourth counter vehicles A, B, C, and D. In this connection, the third avoidance priority level Lv3 may be applied to all of the first to fourth counter vehicles A, B, C, and D, so that objects respectively matched with the first to fourth counter vehicles A, B, C, and D may be displayed in yellow.

However, when a risk of the second counter vehicle B is sensed, as shown in FIG. 6B, an alarm indication may be displayed and a weight value may be applied to the second counter vehicle B. Thus, an avoidance priority level of the second counter vehicle B may be increased from the third avoidance priority level to the second avoidance priority level, and the second counter vehicle B may be displayed in blue. In addition, a safe traveling path E based on the application of the avoidance priority level may be displayed. In this connection, in a case of the autonomous vehicle, steering and acceleration of the autonomous vehicle are controlled based on a path displayed as the safe traveling path E, so that the autonomous vehicle may be further away from the vehicle whose avoidance priority level is increased.

As described above, the display device of the vehicle according to an embodiment of the present disclosure may provide psychological relaxation to the passenger by providing the sensing result of the environmental risk factor of the vehicle as the continuous visual information to the passenger.

Figure 7:
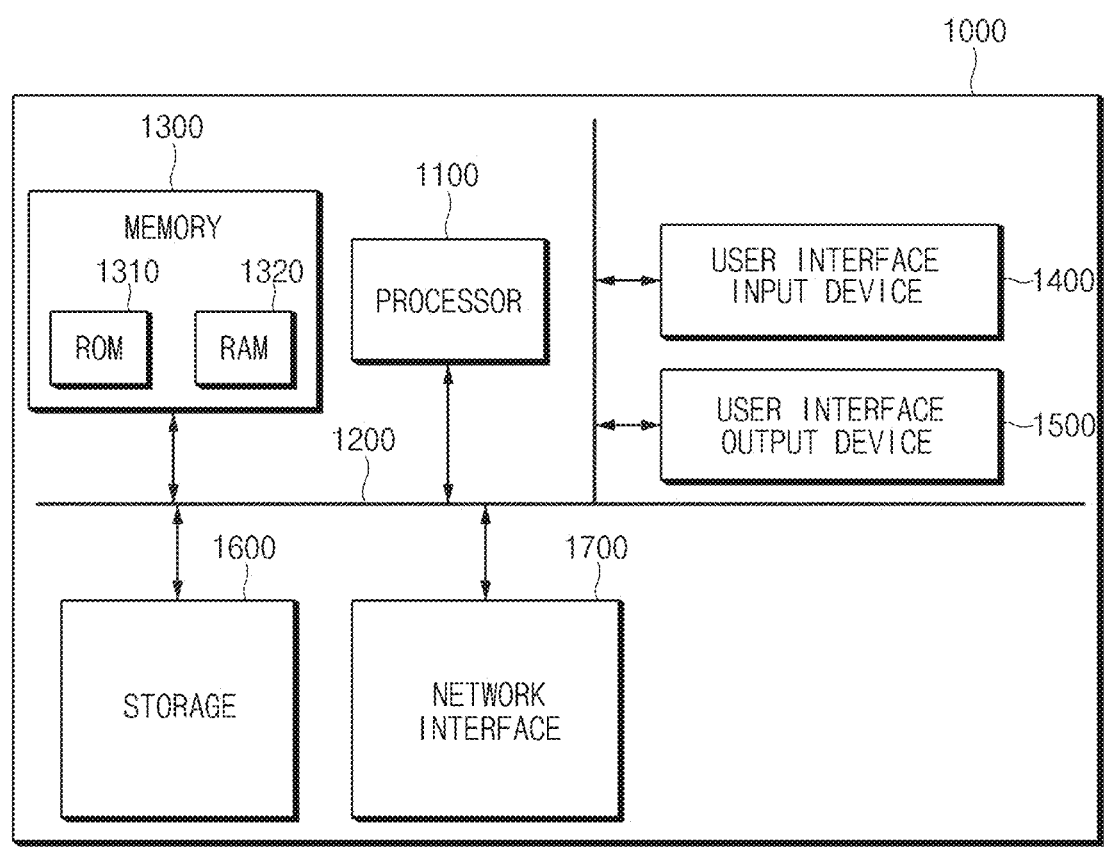
FIG. 7 illustrates a computing system in which a method according to an embodiment of the present disclosure is performed.

FIG. 7 illustrates a computing system in which a method according to an embodiment of the present disclosure is performed.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, a CD-ROM. The storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those having ordinary skill in the art without departing from the essential characteristics of the present disclosure.

Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present disclosure, vehicle traveling information and a fact that the tracking and the detection are being performed on the object outside the vehicle may be displayed to the passenger in the traveling vehicle, so that psychological relaxation may be provided to the driver.

Hereinabove, although the present disclosure has been described with reference to specific embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A display device of a vehicle, the display device comprising:
   a sensor device configured to detect an object located around the vehicle;
   a control module configured to
   read and track the detected object based on a detection result of the sensor device,
   read the detected object based on the detection result of the sensor device to select an avoidance priority level of the read object,
   classify a pedestrian, a two-wheeled vehicle, and a counter vehicle based on the reading result of the detected object, and select the pedestrian as a first avoidance priority level, the two-wheeled vehicle as a second avoidance priority level, and the counter vehicle as a third avoidance priority level; and an information display for providing the reading and tracking result of the object of the control module as continuous visual information to a passenger of the vehicle.

2. The display device of claim 1, wherein the sensor device includes at least one of a camera, a radar, a lidar, an ultrasonic sensor, and an infrared sensor for detecting the object.

3. The display device of claim 1, wherein the control module is configured to apply a weight value to the selected avoidance priority level to change the avoidance priority level when a risk situation is sensed for the object with the selected avoidance priority level.

4. The display device of claim 1, wherein the control module is configured to determine a traveling path of the vehicle based on the avoidance priority level.

5. The display device of claim 1, further comprising:

a switch for determining whether to provide the visual information to the passenger based on manipulation of the passenger.

6. The display device of claim 5, wherein, when the control module is configured, by the passenger, not to provide the visual information to the passenger, the control module automatically provides the visual information to the passenger when the vehicle enters a preset dangerous region.

7. The display device of claim 6, wherein the control module is linked with a GPS or a navigation for measuring a position of the vehicle.

8. The display device of claim 1, wherein the information display displays the detected object on a front windshield of the vehicle to realize an augmented reality image.

9. The display device of claim 8, wherein the information display is one of a transparent display, a head up display (HUD), and a projector.

10. A method for displaying object tracking of a vehicle, the method comprising:

detecting an object in a sensing region around the vehicle;

tracking the detected object;

selecting an avoidance priority level of the object based on a reading and tracking result of the detected object;

determining a traveling path of the vehicle based on the selected avoidance priority level of the object; and displaying the object tracking for displaying the detected object, the selected avoidance priority level, and the traveling path, wherein the selecting of the avoidance priority level includes classifying a pedestrian, a two-wheeled vehicle, and a counter vehicle based on the reading result of the detected object, and selecting the pedestrian as a first avoidance priority level, the two-wheeled vehicle as a second avoidance priority level, and the counter vehicle as a third avoidance priority level.

11. The method of claim 10, wherein the selecting of the avoidance priority level includes:

changing the selected avoidance priority level selected based on the tracking result of the object.

12. The method of claim 11, wherein the selecting of the avoidance priority level includes:

determining a weight value based on the tracking result of the object, and changing the selected avoidance priority level based on the weight value.

13. The method of claim 10, wherein the displaying of the object tracking includes:

realizing the detected object, the selected avoidance priority level, and the determined traveling path as an augmented reality image.

14. The method of claim 13, wherein the displaying of the object tracking includes:

displaying the augmented reality image on a front windshield of the vehicle.

* * * * *